(12) United States Patent
Vester

(10) Patent No.: US 11,327,692 B2
(45) Date of Patent: May 10, 2022

(54) MULTI-PART SURFACE-MOUNTABLE PHYSICAL-ACTIVITY LAMINA AND METHOD OF PRODUCING AND ASSEMBLING SUCH

(71) Applicant: James Edward Vester, Ilkeston (GB)

(72) Inventor: James Edward Vester, Ilkeston (GB)

( * ) Notice: Subject to any disclaimer, the term of this patent is extended or adjusted under 35 U.S.C. 154(b) by 0 days.

(21) Appl. No.: 16/998,589

(22) Filed: Aug. 20, 2020

(65) Prior Publication Data

US 2020/0379691 A1  Dec. 3, 2020

Related U.S. Application Data

(63) Continuation of application No. 15/517,120, filed as application No. PCT/GB2015/051685 on Jun. 9, 2015, now abandoned.

(51) Int. Cl.
*G06F 3/12* (2006.01)
*G06T 11/00* (2006.01)
(Continued)

(52) U.S. Cl.
CPC .......... *G06F 3/1219* (2013.01); *A63B 63/007* (2013.01); *A63B 71/06* (2013.01);
(Continued)

(58) Field of Classification Search
CPC .................. G06F 3/1219; A63B 2209/10
See application file for complete search history.

(56) References Cited

U.S. PATENT DOCUMENTS

| | | | | |
|---|---|---|---|---|
| 4,283,011 A | * | 8/1981 | Spector | A01M 29/12 |
| | | | | 239/36 |
| 4,343,471 A | * | 8/1982 | Calvert | A63F 9/0669 |
| | | | | 273/157 R |

(Continued)

FOREIGN PATENT DOCUMENTS

| | | |
|---|---|---|
| GB | 1290653 | 9/1972 |
| WO | 97/26607 | 7/1997 |
| WO | 2015/028331 | 3/2015 |

OTHER PUBLICATIONS

Search Report and Written Opinion in corresponding PCT Patent Application No. PCT/GB2015/051685, dated Feb. 25, 2016, 11 pages.‡

(Continued)

*Primary Examiner* — King Y Poon
*Assistant Examiner* — Michael Burleson

(57) ABSTRACT

A method is provided of producing and assembling a multi-part surface-mountable physical-activity lamina for use in aiding or supplementing a physical-activity in a physical-activity environment. There is a step a] of providing a first graphic design model of the lamina; and b] segmenting the first graphic design model into a plurality of graphic design model portions. A step c] follows of arranging the graphic design model portions into a more compact second graphic design defining a reduced surface area; and then d] the second graphic design being applied to a lamina substrate having another surface area. The lamina substrate is then separated into lamina elements corresponding to the graphic design model portions, followed by a step e] of assembling the lamina elements onto a mounting surface at a physical-activity environment to form the surface-mountable physical-activity lamina.

23 Claims, 7 Drawing Sheets

(51) Int. Cl.
*A63B 63/00* (2006.01)
*A63B 71/06* (2006.01)
*B29C 65/48* (2006.01)
*B29C 65/56* (2006.01)
*B29K 669/00* (2006.01)

(52) U.S. Cl.
CPC ............ *B29C 65/48* (2013.01); *B29C 65/562* (2013.01); *G06F 3/125* (2013.01); *G06F 3/1252* (2013.01); *G06F 3/1285* (2013.01); *G06T 11/00* (2013.01); *A63B 2071/0694* (2013.01); *A63B 2209/10* (2013.01); *B29K 2669/00* (2013.01)

(56) References Cited

U.S. PATENT DOCUMENTS

| | | | | |
|---|---|---|---|---|
| 4,787,158 | A | * | 11/1988 | Vital .......................... G09F 3/02 156/289 |
| 4,855,182 | A | * | 8/1989 | Ondrejas ................. B29C 73/10 428/343 |
| 5,521,997 | A | ‡ | 5/1996 | Rovenolt ............. G02B 6/3831 385/75 |
| 5,642,147 | A | * | 6/1997 | Yamashita ................ B41J 2/325 347/171 |
| 5,936,770 | A | ‡ | 8/1999 | Nestegard ............. G02B 5/124 359/529 |
| 9,180,688 | B2 | * | 11/2015 | Nagahara ................ B41J 11/663 |
| 2004/0068515 | A1 | * | 4/2004 | Hallman .................. G06F 9/451 |
| 2004/0121699 | A1 | ‡ | 6/2004 | Ladner ................. A63H 33/082 446/85 |
| 2005/0093232 | A1 | * | 5/2005 | Stout .......................... A63F 9/10 273/153 R |
| 2006/0236237 | A1 | * | 10/2006 | Peiro ..................... G06F 40/103 715/203 |
| 2006/0249949 | A1 | * | 11/2006 | Fortune .................. G01K 11/12 283/72 |
| 2008/0147219 | A1 | ‡ | 6/2008 | Jones et al. .............. A43D 8/16 700/95 |
| 2010/0111587 | A1 | ‡ | 5/2010 | Johnson ................... B41J 11/46 400/619 |
| 2014/0206423 | A1 | * | 7/2014 | Weed .................... A63F 3/0478 463/9 |
| 2014/0267383 | A1 | ‡ | 9/2014 | Javidan ............... H04M 1/0283 345/619 |

OTHER PUBLICATIONS

Great Britain Examination Report dated Mar. 12, 2019 for related Great Britain Application No. GB1720530.3, 2 pages.
Decowall DW-1204 10 Transports and Roads Kids Wall Stickers Wall Decals Peel and Stick Removable Wall Stickers for Kids Nursery Bedroom Living Room; https://www.amazon.co.uk/Decowall-DW-1204-Transports-Stickers-Removable/dp/B0093JH002; 8 pages.

\* cited by examiner
‡ imported from a related application

MULTI-PART SURFACE-MOUNTABLE PHYSICAL-ACTIVITY LAMINA AND METHOD OF PRODUCING AND ASSEMBLING SUCH

CROSS-REFERENCE TO RELATED APPLICATIONS

This application claims priority to and is a continuation of U.S. Ser. No. 15/517,120, filed Apr. 5, 2017, and entitled "MULTI-PART SURFACE-MOUNTABLE PHYSICAL-ACTIVITY LAMINA AND METHOD OF PRODUCING AND ASSEMBLING SUCH," which is the U.S. National Stage of International Patent Application No. PCT/GB2015/051685, filed Jun. 9, 2015, and entitled "MULTI-PART SURFACE-MOUNTABLE PHYSICAL-ACTIVITY LAMINA AND METHOD OF PRODUCING AND ASSEMBLING SUCH," the disclosures of both above-identified applications are each herein incorporated by reference in their entireties.

FIELD OF THE TECHNOLOGY

The present invention relates to a method of producing and assembling a multi-part surface-mountable physical-activity lamina, preferably but not necessarily exclusively for use in aiding or supplementing a physical activity in a physical-activity environment, such as a fitness gym, physical therapy center and/or rehabilitation unit. The invention further relates to a method of reducing material wastage in a multi-part surface-mountable physical-activity lamina, to a multi-part surface-mountable physical-activity lamina, and also to a method of producing and assembling a multi-part surface-mountable lamina.

BACKGROUND

Graphic designs are used in a wide variety of contexts as indicia to a viewer or user, or to provide a visual appeal. In the context of physical-activity environments, such as gymnasia, or physical therapy or rehabilitation centers, such graphic designs might be used to acts as signs to the viewer. For example, a graphic design might indicate the boundaries and critical areas of a sports pitch or field, may define a nominal safety zone around heavy or dangerous machinery and/or equipment, or may define a path for a person performing an exercise task to follow, by way of example.

There are various ways in which graphic designs may be applied to a surface, such as a wall or floor. A graphic design may be painted onto the surface, but this is a cumbersome and labor-intensive process, and errors are difficult to correct. Painting is also semi-permanent, making a given physical-activity environment challenging to repurpose once painted.

Floor graphics can also be produced by embedding a particular, possibly colored, material into the flooring, for instance, by water-jetting the base flooring product with the graphic design, and then replacing the material removed with a graphically desirable equivalent. Other means of removing an area shaped to the graphic design are possible, such as laser or blade cutting of the flooring product, but these result in significant amounts of damage to the flooring. Embedding processes are therefore permanent alterations to the flooring. Additionally, there are significant limitations to style, shape and form of the graphic designs which can be applied, since the embedded material needs to have a hard edge-line, prohibiting gradation in the coloration across the graphic design.

Less permanent methods of applying graphic designs are known, and these typically, require a one-piece lamina of the graphic design to be printed and cut to size, before being adhered to the surface to which it is to be mounted. If there are significant voids in the graphic design, as is typically the case, there is a great deal of material wastage associated with the production of the lamina, as material from the voids cannot be reused once separated. Additionally, large laminas are difficult to transport safely without causing damage to the surface covering in transit.

It can also be difficult to apply a large lamina to a flat surface without causing air pockets to be trapped thereunder, resulting in distortion of the surface-covering lamina and therefore of the visible graphic design during installation.

It is therefore an object of the present invention to provide a means of producing a lamina of a graphic design which obviates or limits the above-mentioned problems.

SUMMARY

According to some embodiments of the present disclosure, there is provided a method of producing and assembling a multi-part surface-mountable physical-activity lamina for use in aiding or supplementing a physical activity in a physical-activity environment and which defines a first surface area, the method comprising the steps of a] providing a first graphic design model of the said physical-activity lamina; b] segmenting the first graphic design model into a plurality of graphic design model portions; c] arranging the graphic design model portions into a more compact second graphic design defining a second surface area which is less than the said first surface area; d] the second graphic design being applied to a lamina substrate having a third surface area which is less than the said first surface area, the lamina substrate being separated into lamina elements corresponding to the graphic design model portions; and e] assembling the lamina elements onto a mounting surface at a physical-activity environment to form the surface-mountable physical-activity lamina.

The use of the term 'lamina' used herein and throughout is intended to mean a slim plate-like or sheet-like surface covering, preferably being no more than 10 mm in thickness, and more preferably being no more than 6 mm in thickness across its entire or at least a majority of its major and minor dimensions; the term 'lamina' is also intended to include a single one-piece unitarily-formed surface-coverable device, or a composite surface-coverable device which is formed of two or more overlying or superposed layers or laminates.

Some benefits may be included of the present invention that the compact second graphic design can be produced so as to minimize the excess sheet material that would otherwise be present on the lamina substrate were the first graphic design to be produced in full. This may substantially reduce the cost and hulk of the lamina prior to assembly.

Furthermore, by dividing the lamina into lamina elements, the assembly of the complete lamina is significantly simplified. Smaller lamina elements are less likely to trap air underneath which would otherwise distort the visual appeal of the graphic design.

Preferably, in step b], each of the graphic design model portions may have a positioning locator associated therewith. Said positioning locators may be complementarily-shaped to interengage with each other. Additionally or alternatively, the positioning locators may be alignment markers, and step b] includes the use of an alignment tool, which may include a laser.

Providing positioning locators associated with the graphic design model portions, which follow through to the resultant lamina elements, allows a user to readily align and/or interengage [not familiar with word and not is spell check] the lamina elements during assembly of the lamina. This ensures that even an inexperienced operator can install the lamina so as to present the graphic design thereon in a correct alignment without needing to reinstall the whole lamina. These could be physically interacting positioning elements, or potentially just markers which can be aligned for closest neighbor lamina elements.

In step d], the second graphic design may be printed on the lamina substrate. Alternatively, in step d], the second graphic design may be applied to the lamina substrate by way of cutting The application of the second graphic design to the lamina substrate may be advantageously applied in a number of ways. By printing, aesthetically complex graphic designs can be applied to the lamina with little difficulty, whereas cutting the lamina substrate to produce lamina elements is a simple and effective way of quickly producing the lamina if a simple and/or uniform coloration or design is required.

Preferably, in step d], a user-facing layer may be provided overlying the lamina substrate, the user-facing layer having a coefficient of friction which is greater than that of the lamina substrate. Furthermore, the user-facing layer may include an ultraviolet light resistance characteristic.

A user-facing layer may overlay the lamina substrate, to be installed as part of the lamina. Such a user-facing layer can advantageously and significantly increase the durability and robustness of the lamina, particularly for situations where the surface to which the lamina has been mounted is a floor, and users are likely to traverse the lamina repeatedly.

The lamina substrate may include a mounting-surface-facing adhesive layer for bonding the surface-mountable physical-activity lamina to the mounting surface in step e].

The simplest means by which the lamina may be affixed to the mounting surface is by use of an adhesive layer. This can be advantageously achieved by providing a lamina substrate having an adhesive layer pre-applied thereon, or by applying the adhesive layer to the lamina substrate during production of the lamina.

In a preferred embodiment, during step a], the first graphic design model may be provided as a digital graphic design model. Optionally, the digital graphic design model may be in portable document format.

By providing the graphic design model in a digital format, the later segmentation and rearrangement stages can be performed on a computer, thereby allowing for rapid optimization of the surface area of the compact second graphic design. Furthermore, the optimization may occur to a greater degree than can be achieved manually.

The first graphic design model may have a plurality of major and minor graphic features which form the surface-mountable physical-activity lamina, the segmentation in step b] being at or adjacent to an intersection between a major and minor graphic feature.

By determining major and minor graphic features of the graphic design, it becomes possible to perform the segmentation of the graphic design model in positions which disrupt the overall appearance of the graphic design to a minimal degree, for example, by performing the segmentation at natural joins or intersections in the graphic design. This can beneficially improve the final aesthetic appearance of the graphic design of the assembled lamina.

Optionally, during step b], the first graphic design model may be segmented into segments of repeatable dimensions.

Segmenting the graphic design model into segments of repeatable dimensions ensures that said segments are more likely to closely fit with one another once rearranged. Close-fitting segments can be arranged on a smaller surface area, resulting in minimal material wastage once the second graphic design is applied to the lamina substrate.

During step c], the second graphic design may be determined by an operator and/or computationally, and additionally or alternatively may be determined so as to optimally fit into a quadrilateral-shaped said lamina substrate during step d].

Lamina substrates onto which lamina are printed are typically quadrilateral, and therefore for simplicity, it is beneficial to attempt to optimize the dimensions of the second graphic design so as to fit into a quadrilateral with as little material wastage as possible.

In some embodiments, the said plurality of lamina elements may be demarcated on the lamina substrate, and, during step d], the said plurality of lamina elements may be manually or mechanically cut from the lamina substrate.

Demarcation of the lamina elements onto the lamina substrate allows the lamina substrate to be shipped to the location in which it is to be installed, limiting the potential for damage to occur to the individual lamina elements in transit, and allowing the lamina elements to then be cut on location.

Ideally, the surface-mountable physical-activity lamina may be for use in or aiding at least one of fitness, physical therapy and rehabilitation.

The durability of the present surface-mountable physical-activity lamina makes it ideal for situations in which the lamina is likely to come under significant physical duress, such as in fitness, physical therapy or rehabilitation contexts, wherein a user is likely to encourage physical contact between the lamina and themselves, or sports equipment and similar.

According to a second aspect of the invention; there is provided a method of reducing material wastage in a multi-part surface-mountable physical-activity lamina for use in aiding or supplementing a physical-activity in a physical-activity environment and which defines a first surface area, the method comprising the steps of a] providing a first graphic design model of the said physical-activity graphic lamina; b] segmenting the first graphic design model into a plurality of graphic design model portions; c] arranging the graphic design model portions into a more compact second graphic design defining a second surface area which is less than the said first surface area; and di the second graphic design being applied to a lamina substrate having a third surface area which is less than the said first surface area, the lamina substrate being separated into lamina elements corresponding to the graphic design model portions.

By providing a means of reducing the surface area utilized by a particular graphic design, it becomes possible to substantially reduce the material wastage which is not used in the lamina substrate as pail of the lamina. This consequently leads to significant reductions in the cost of manufacture of such a lamina. For example, utilizing the methods of the present disclosure the material usage may be reduced to half, one third, one fourth, one fifth, or even less. For example, if a six foot (1.83 meters) by six foot (1.83 meters) material were to be used, it may traditionally require thirty-six square feet (3.35 square meters) of material, while the present disclosure may reduce that usage to five and a half or six square feet, typically being 0.46 square meters to 0.56 square meters.

In step d], the third surface area of the lamina substrate may be greater than or equal to the second surface area of the second graphic design.

Unless the second graphic design can be compacted into a quadrilateral-shaped space, the lamina substrate will naturally have a greater surface area. Minimizing the discrepancy between the second and third surface areas results in the minimum amount of material wastage which separating the lamina elements from the lamina substrate.

The method may further comprise the subsequent step e] of: assembling the lamina elements onto a mounting surface to form the surface-mountable physical-activity lamina.

By assembling lamina elements onto the surface to which they are to be mounted, a multi-part lamina can be assembled, allowing for a more straightforward construction of, for example, a fitness graphic.

Preferably, the method may further comprise a subsequent step f] of: replacing a lamina element forming the assembled multi-part surface-mountable physical-activity lamina when damaged without requiring replacement of the whole multi-part surface-mountable physical-activity lamina.

Advantageously, by assembling the lamina from a plurality of independently affixable lamina elements, a single lamina element can be replaced if damaged. This significantly reduces the cost and effort associated with the repair and maintenance of an installed lamina for a given graphic design.

According to a third aspect of the invention, there is provided a multi-part surface-mountable physical-activity lamina for use in aiding or supplementing a physical activity in a physical-activity environment and which defines a first surface area, the lamina comprising a plurality of lamina elements each having a surface area which is less than that first surface area and arrangeable to define the multi-part surface-mountable lamina.

In one embodiment, the lamina elements may include positioning locators for positioning adjacent said lamina elements. Said positioning locators may be formed as male and female matable locators respectively on in-use adjacent lamina elements, and/or the positioning locators may be formed as alignment markers. Furthermore, each lamina element may include an adhesive surface-facing layer for adherable engagement with a mounting surface.

The provision of a multi-part surface-mountable physical-activity lamina enables a physical activity being performed, be it fitness-, physical therapy-, or rehabilitation-related, to be enhanced by the incorporation of a graphic design into the physical activity environment. The multi-part nature of the lamina therefore makes it both simple to install and align correctly, whilst also reducing the amount of material wastage in the production of the lamina.

According to a fourth aspect of the invention, there is provided a method of producing and assembling a multi-part surface-mountable lamina and which defines a first surface area, the method comprising the steps of: a] providing a first graphic design model of the said lamina; b] segmenting the first graphic design model into a plurality of graphic design model portions; c] arranging the graphic design model portions into a more compact second graphic design defining a second surface area which is less than the said first surface area; d] the second graphic design being applied to a lamina substrate having a third surface area which is less than the said first surface area, the lamina substrate being separated into lamina elements corresponding to the graphic design model portions; and e] assembling the lamina elements onto a mounting surface to form the surface-mountable lamina.

Whilst the aforementioned lamina is primarily used in physical activity contexts, it will be appreciated that the method of producing and assembling such a lamina could advantageously be applied to alternative fields, whilst still retaining all of the associated benefits of the lamina.

A specific embodiment of the multi-part surface-mountable physical-activity lamina will now be more particularly described, by way of example only, with reference to the accompanying drawings.

DETAILED DESCRIPTION

Figure 1:
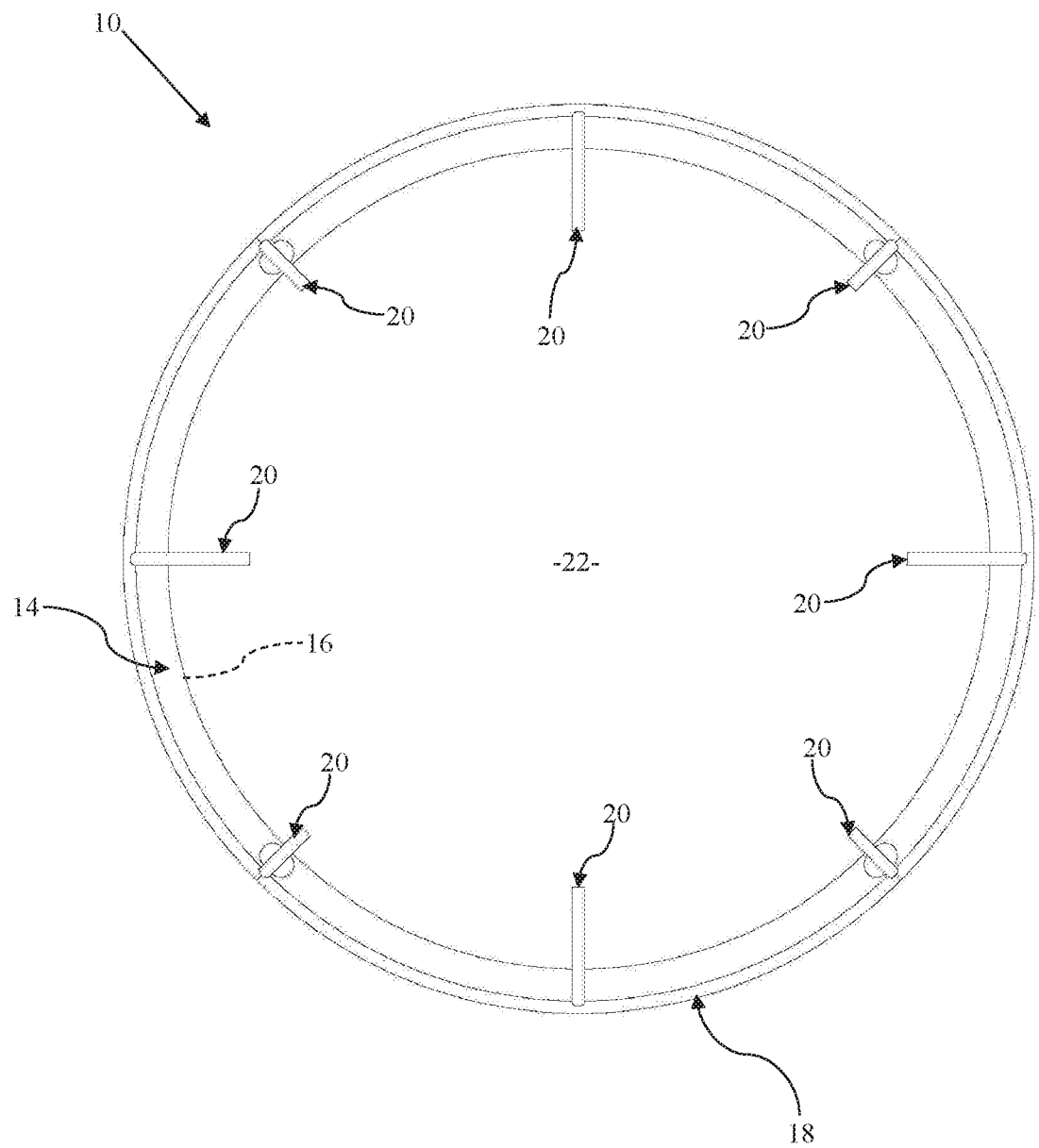
FIG. 1 shows a plan view of a first embodiment of a multi-part surface-mountable physical-activity lamina, in accordance with the third aspect in accordance with some embodiments of the present disclosure.
Figure 2:
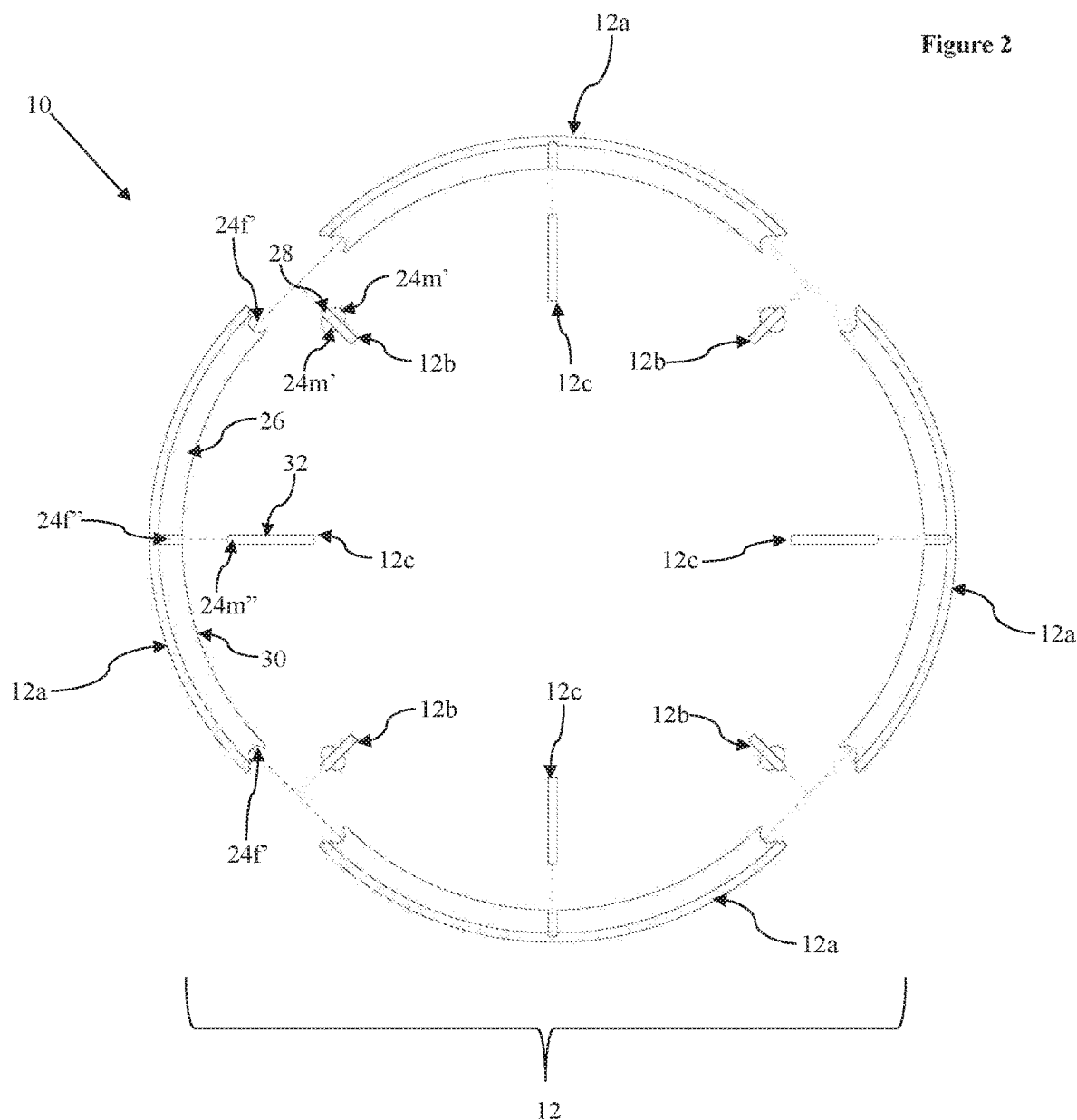
FIG. 2 shows an exploded plan view of the multi-part surface-mountable physical-activity lamina of FIG. 1.

Referring firstly to FIGS. 1 and 2 of the drawings, there is shown a first embodiment of a multi-part surface-mountable physical-activity lamina, indicated globally at 10, and which is used to aid or supplement a physical activity in a physical-activity environment, by demarcation of an exercise region in a gymnasium, for instance. The illustrated lamina 10 demarcates a target on a surface, such as a floor or wall, and could be used to assist a user with a throwing accuracy exercise, for example. A wide range of laminas could be designed, however, for any number of uses in fitness, physical therapy, or rehabilitation contexts, and so forth.

The lamina 10 is formed from a plurality of lamina elements 12 which can be assembled into a complete graphic design once connected to form the lamina 10 as a whole. The lamina 10 is shown in an exploded configuration in FIG. 2 to highlight the individual lamina elements 12.

The lamina 10 and thus lamina portions 12 are formed preferably as layered structures; a media layer is preferably formed having an upper user-facing layer 14 on one side and a mounting-surface-facing layer 16 on an opposite side to the user-facing layer 14. The media acts as a base substrate, herein throughout referred to as a lamina substrate, for the lamina 10 as a whole. The base or lamina media substrate is a thin single or composite layer which is preferably pliantly flexible and which may be adapted to receive or carry one or more layers on one or both major surfaces.

The user-facing layer 14 is, in the depicted embodiment, imbued with a variety of characteristics which serve to improve the durability of the lamina 10. The user-facing layer 14 may be formed from a material having a coefficient of friction which is greater than that of the underlying media, and may furthermore be formed from a material having ultraviolet light resistance characteristics. The user-facing layer 14 in the depicted embodiment may be formed from a polycarbonate material, but other materials having similar or different resilient characteristics may be alternatively used to alter the durability or other characteristics of the lamina 10.

Once formed, the lamina 10 will typically have a thickness of around nine millimeters to thereby sit substantially flush with a surface to Which the lamina 10 is to be applied. Other thicknesses could naturally be formed as desired, however. Preferably, the thickness is in the range of 1 millimeter to 15 millimeters, more preferably the thickness is in the range of 5 millimeters to 10 millimeters, and most preferably in this case the thickness is as mentioned above, being 9 millimeters.

The mounting-surface-facing layer 16, illustrated by the hidden underside of the lamina 10 in FIG. 1, and indicated by a dashed line, in the depicted embodiment is formed as an adhesive layer for bonding the lamina 10 to the surface to Which it is to be mounted, but it will be appreciated that other mounting means are possible. Where an adhesive layer is used, this could be attached to the media so as to have a removable protective backing, allowing the lamina 10 to be readily attached to a surface, or the adhesive may be applied at the point of installation.

In the present embodiment, the lamina 10 may be formed as a target-shape, that is, as a hollow circular body or annulus 18 with radially spaced-apart inward projections 20 emanating from the circular body 18. There is therefore a void 22 in the center of the lamina 10 once installed. The lamina elements 12 are therefore segments of the whole lamina 10, and three types of lamina element are shown in FIG. 2: arcuate lamina elements 12a; arc-connector lamina elements 12b; and projection lamina elements 12c.

The lamina elements 12 are therefore preferably mutually interengagable to form the Whole lamina 10. An arcuate lamina element 12a has a female connector positioning locator 24f at each of the longitudinal ends of an arc body 26 of the arcuate lamina element 12a. An arc-connector lamina element 12b has a central stem 28 from which laterally extend two male connector positioning elements 24m' which are complementarily-shaped so as to engage with the female connector positioning elements 24f of the arcuate lamina elements 12a.

At a center of an inner arc 30 of each arc body 26 is formed a female projection positioning locator 24f'. The projection lamina elements 12c are formed having elongate projection body portions 32, an end of which acts as a male projection positioning locator 24m", again being complementarily-shaped so as to matably engage with the corresponding female projection positioning locators 24f'.

To assemble the lamina 10, an arcuate lamina element 12a can be attached to the surface to which it is to be mounted. A projection lamina element 12c can be inserted such that the male projection positioning locator 24m" mates with the female projection positioning locator 24f' in the arc body 26, and an arc-connector lamina element 12b can be affixed adjacent to a longitudinal end of the arc body 26 such that the male connector positioning locator 24m' matably engages with the female connector positioning locator 24f.

This combination of arcuate lamina element 12a, arc-connector lamina element 12b and projection lamina element 12c thereby forms a repeatable unit, of which there are four in the depicted embodiment, and the remaining lamina elements 12 can be affixed in sequence to form the complete lamina 10.

Evidently, the above description is specific to the illustrated graphic design for the multi-part surface-mountable physical-activity lamina 10, and the segmentation of the lamina 10 into the specific lamina elements 12 will naturally be dependent upon the graphic design of lamina 10 utilized. Indeed, an alternative segmentation of the depicted lamina 10 is possible, at alternative interfaces between major and minor graphic features.

One of the advantages of the present invention is the ability to decompose the multi-part surface-mountable physical-activity lamina 10 into lamina elements 12 which have a cumulative surface area which is much less than that of the whole unbroken lamina 10. The method of producing and subsequently assembling the lamina 10 is therefore important to the efficiency of manufacturing a lamina, and such a method is indicated globally as S1 in FIG. 5.

Figure 5:
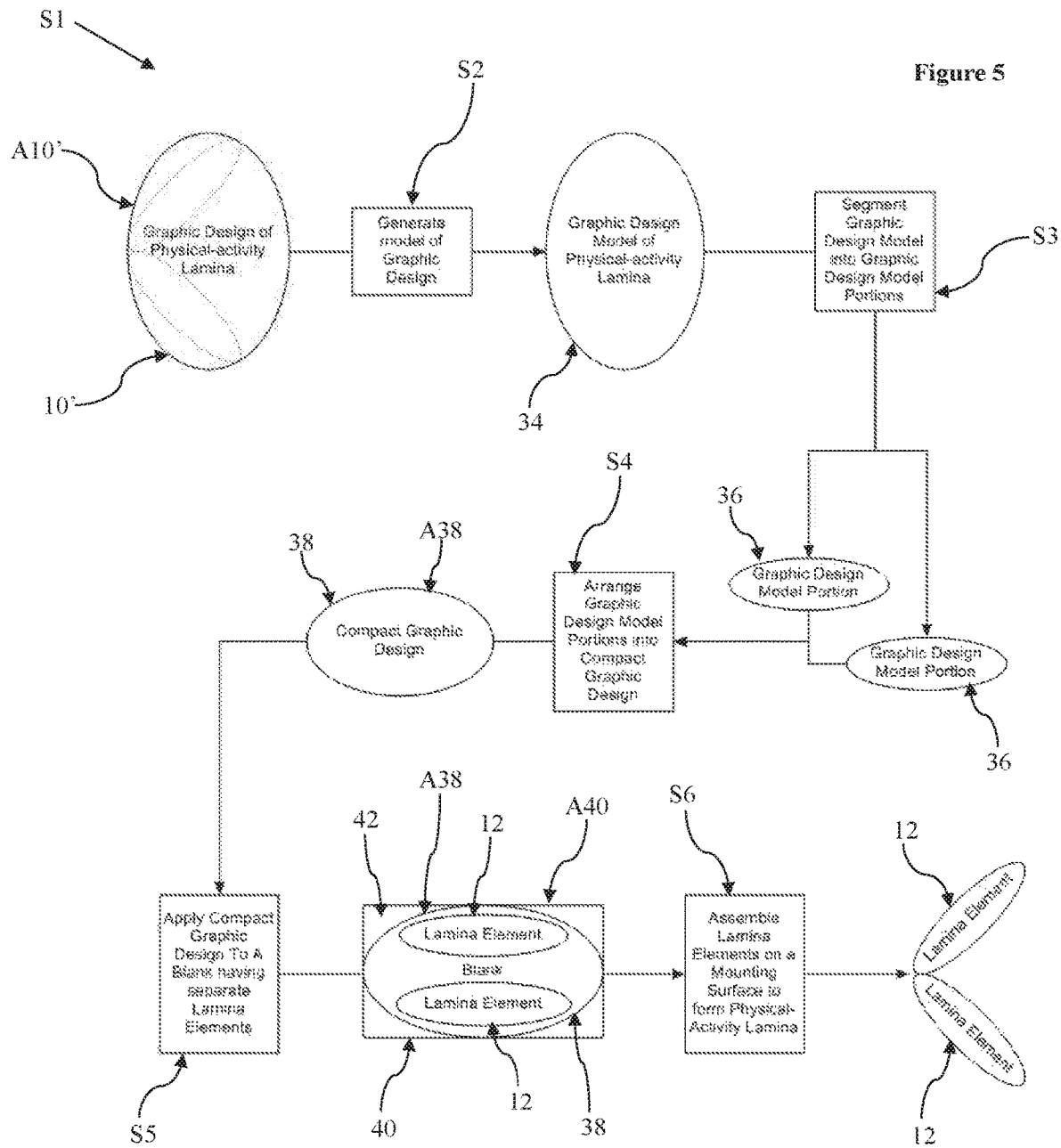
FIG. 5 shows a diagrammatic representation of a method of producing and assembling a multi-part surface-mountable physical-activity lamina, in accordance with the first aspect of the invention.

To produce a lamina 10, the first step is to create the graphic design which is to be used, indicated in the diagrammatic method chart of FIG. 5 as 10', and then generating at step S2 a model of the graphic design 10'. This graphic design model, indicated at 34, is typically digital or computer-generated and stored electronically, often in portable document format, but the graphic design model 34 could feasibly be created manually.

The graphic design model 34 is then segmented at step S3 into a plurality of graphic design model portions 36; these graphic design model portions 36 are to the graphic design model 34 as the lamina elements 12 are to the lamina 10. The segmentation at step S3 is generally performed by an operator, determining where to segment the graphic design model 34 by eye. However, it will be appreciated that this segmentation at step S3 could be automated.

The determination of the segmentation at step S3 of the graphic design model portions 36 is potentially achieved by determining one or more major and/or minor graphic features of the lamina 10 which are present in the graphic design model 34. To simplify segmentation at step S3, the operator would rely on these major and/or minor graphic features and extract the graphic design model portions 36 at intersections of the major and/or minor graphic features to limit the effect of the segmentation at step S3 on the resultant lamina 10. As previously indicated, the segmentation at step S3 of the depicted lamina 10 as shown in FIG. 2 could be achieved in a number of different ways.

In the above-described embodiment of the lamina 10, the major graphic features might be the circular body 18, with the minor graphic features being the radially spaced-apart inward projections 20. The segmentation at step S3 in said lamina 10 occurred along the intersections between these features, eventually forming arcuate lamina elements 12a, arc-connector lamina elements 12b and projection lamina elements 12c.

The segmentation at step S3 may also be achieved by identifying segments of the graphic design model 34 which have repeatable dimensions, since such graphic design model portions 34 may tessellate or closely-fit with one another, thereby reduced the total area which will be required to create the eventual lamina elements 12.

Once the graphic design model 34 has been segmented at step S3 into graphic design model portions 36, the said graphic design model portions 36 can be arranged at step S4 into a more compact graphic design 38 which has a second surface area A38 which is less than the first surface area A10' as defined by the first graphic design 10'. The compact graphic design 38 will have all of the necessary graphic design model portions 36 contained therein, but will be arranged in a space-efficient manner with respect to the first graphic design 10', and is often referred to as a production sheet for the production method S1. Again, this arrangement at step S4 is presently performed manually by an operator, but could feasibly be automated.

For ease of production of the resultant lamina 10, the arrangement at step S4 is designed to be performed so that the compact graphic design 38 optimally fits within the confines of a lamina substrate 40 during printing of the lamina 10. In most embodiments, the lamina substrate 40 may be quadrilateraley shaped, but need not be. For example, the lamina substrate may be circular or non-circular, and if non-circular, then the lamina substrate may be any suitable polygonal shape having less than or more than four sides.

Figure 3:
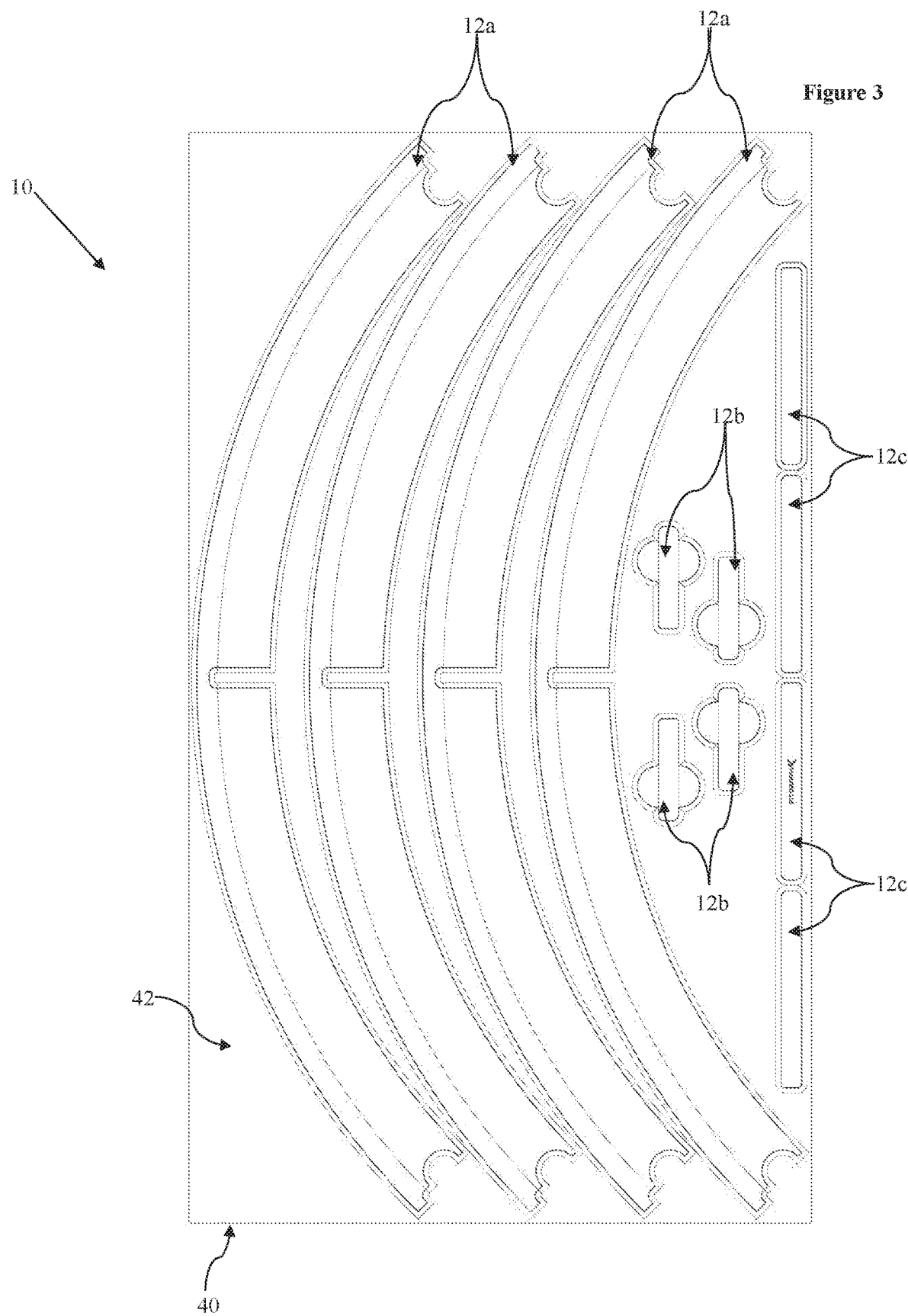
FIG. 3 shows a plan view of a first embodiment of a lamina substrate having a compact graphic design thereon, used in the production assembly of the multi-part surface-mountable physical-activity lamina of FIG. 1 and in accordance with the first aspect of the invention.

Following the arrangement at step S4 of the graphic design model portions 36 into the compact graphic design 38, the compact graphic design 38 can be applied at step S5 to a lamina substrate 40, which as indicated above, is typically quadrilateral-shaped. A lamina substrate 40 for the above-described lamina 10 is illustrated in FIG. 3. Generally, the compact graphic design 38 will be applied at step S5 to the lamina substrate 40 via a printing process, but alternative means of application may be considered. For instance, where the lamina substrate 40 is already correctly colored, the compact graphic design 38 may be applied directly to the lamina substrate 40 by cutting, potentially by applying a kiss cut so as not to remove the lamina elements 12 from the lamina substrate 40 immediately.

The lamina substrate 40 has a third surface area A40 which is less than that of the first surface area A10', that is, that of the said graphic design 10'. Generally, the third surface area A40 will be greater than that of the second surface area A38, though the two surface areas A38, A40 could feasibly be identical if the compact graphic design 38 is in itself quadrilateral. The lamina substrate 40 is separated into lamina elements 12 which correspond to the aforementioned graphic design model portions 36. The lamina substrate 40 itself therefore comprises the plurality of lamina elements 12 connected to one another by excess sheet material 42, which eventually goes to waste.

The separation into lamina elements 12 could feasibly be concurrent with the application at step S5 of the compact graphic design 38 to the lamina substrate 40, such that the lamina elements 12 are supplied physically dislocated to one another prior to assembly, or the lamina substrate 40 could be supplied as a single piece, which can then be cut at the point of assembly. Such cutting could be performed manually or mechanically, and to assist with this, the lamina elements 12 may be demarcated on the lamina substrate 40.

Figure 4:
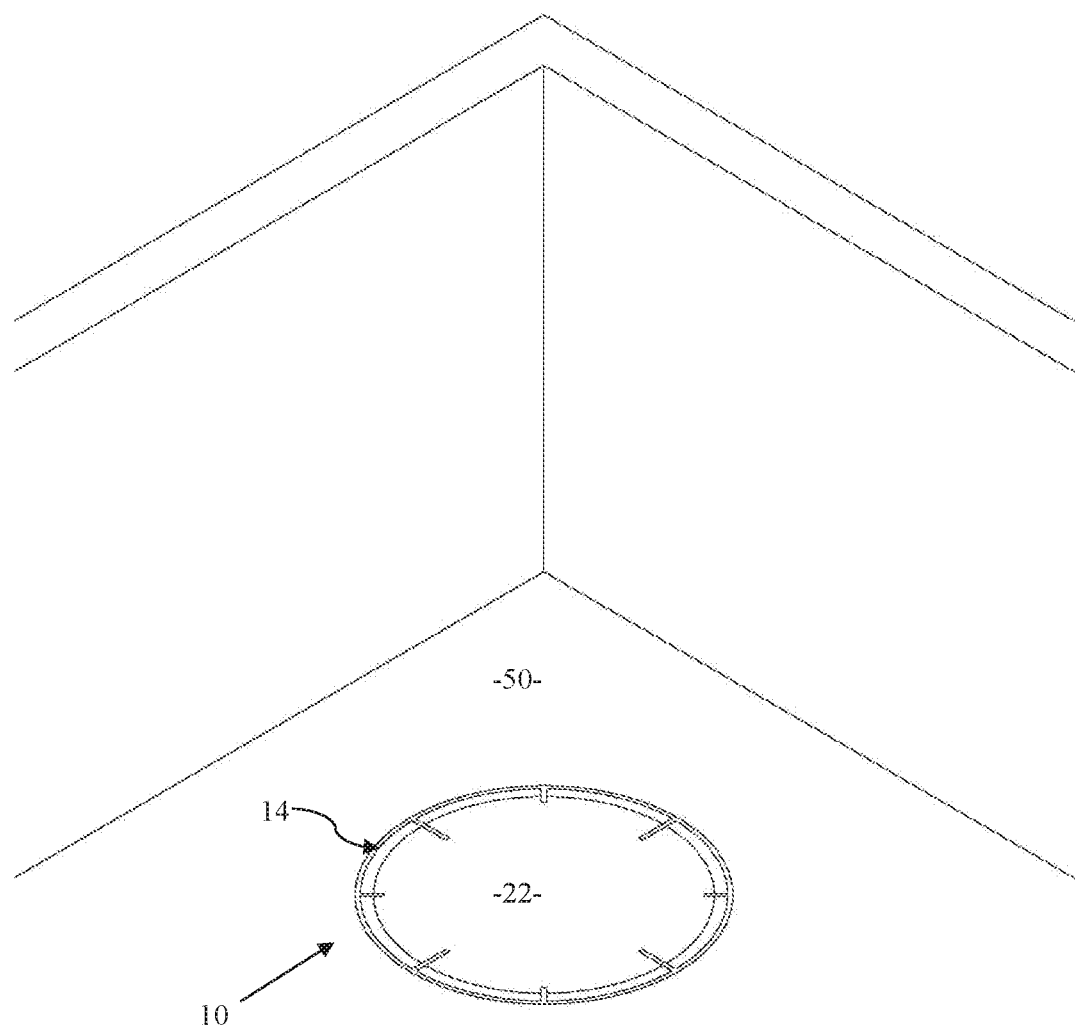
FIG. 4 shows a perspective representation of the multi-part surface-mountable physical-activity lamina of FIG. 1, installed on the floor of a room as an example.

Once the lamina elements 12 are separated from the lamina substrate 40, they can be assembled at step S6 on a mounting surface, such as the floor 50 illustrated in FIG. 4, preferably at a physical-activity environment. The lamina elements 12, once assembled at step S6, thereby form the surface-mountable physical-activity lamina 10.

This method of production and assembly S1 may simplify the process for installation of a surface-mountable physical-activity lamina 10. This is particularly useful where a large graphic design having a great deal of wasted space in the form of voids is created. Similarly, by providing a plurality of individual lamina elements 12, should a single lamina element 12 become damaged in use, the damaged lamina element 12 can be replaced in isolation, without the user needed to replace the entire lamina 10.

Figure 6:
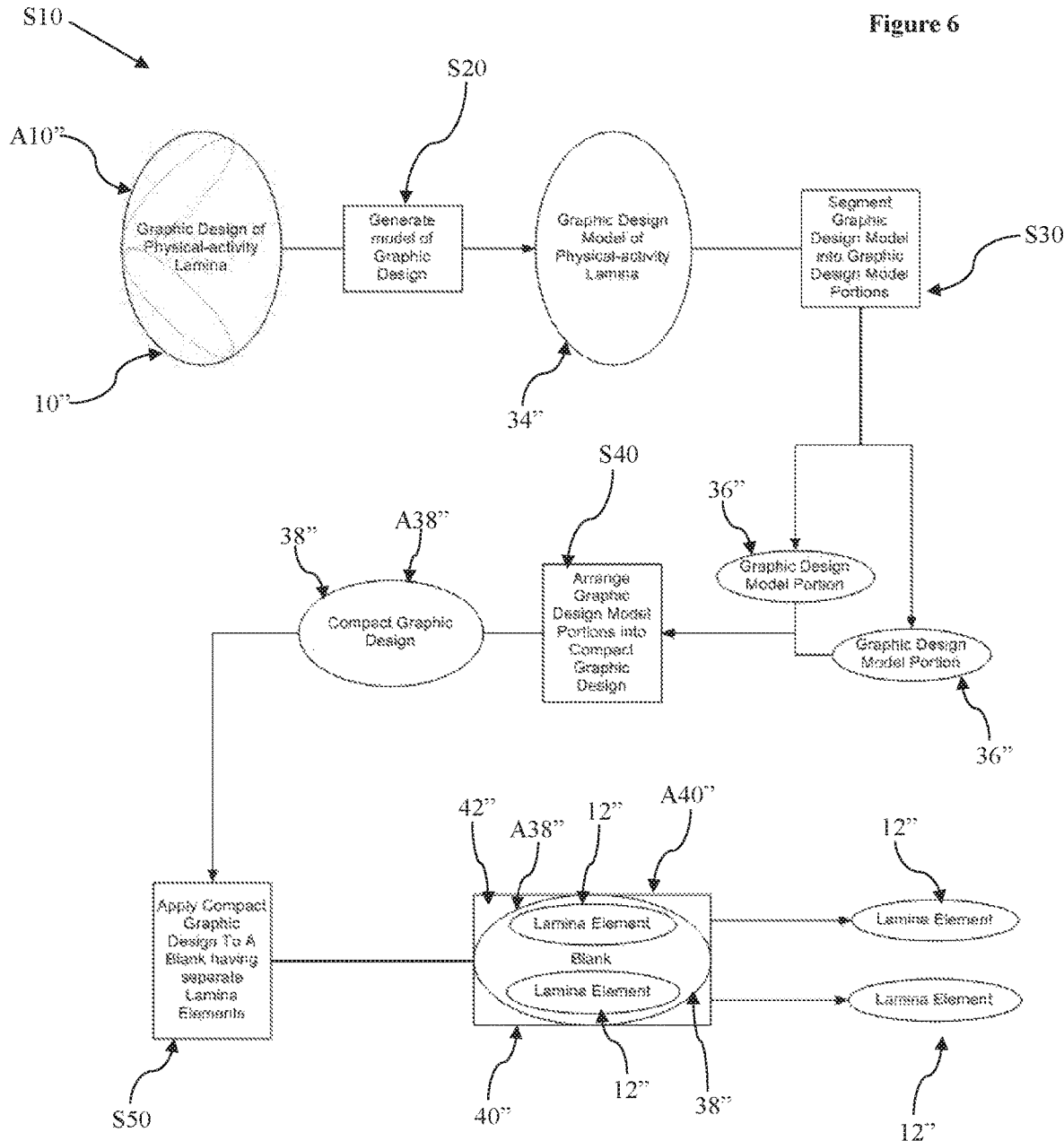
FIG. 6 shows a diagrammatic representation of a method of reducing material wastage in a multi-part surface-mountable physical-activity lamina, in accordance with the second aspect of the invention.

A modified method is illustrated in FIG. 6, showing the reduction in material wastage associated with the present disclosure, indicated globally at S10. A graphic design 34" is created for a multi-part surface-mountable physical-activity lamina 10 for use in aiding or supplementing a physical-activity in a physical-activity environment and which defines a first surface area S10", which would result in a large proportion of material wastage were the graphic design 10" to be printed as a whole.

A first graphic design model 34" of the lamina 10 is produced at step S20, which is then segmented at step S30 into a plurality of graphic design model portions 36". The graphic design model portions 36" are then arranged at step S40 into a more compact second graphic design 38" defining a second surface area. A38" which is less than the first surface area A10".

Subsequently, the compact second graphic design 38" can be applied at step S50 to a lamina substrate 40" having a third surface area A40", the lamina substrate 40 being separated into lamina elements 12 corresponding to the graphic design model portions 36". By reducing the surface area A10" of the graphic design 34" to that of the surface area A38" of the compact graphic design 38", it is possible to minimize the excess sheet material 42" of the lamina substrate 40", substantially reducing the material wastage of the production process, and consequently making the production of the lamina 10 more cost-effective.

As an additional benefit, the use of lamina elements 12 having positioning locators 24 enables the rapid installation of lamina elements 12 into a complete lamina 10, as is the case for the above-described lamina elements 12. In some embodiments, the matable engagement ensures that, if the user installs the positioning locators 24 correctly, the complete lamina 10 can be installed without the need to re-lay any of the individual lamina elements 12, as alignment of lamina elements 12 will occur naturally if the positional engagement of the positioning locators 24 is correct. The lamina 10 can be readily installed in situ whilst limiting the risk of erroneous lamina element 12 placement, as shown in FIG. 4.

Figure 7:
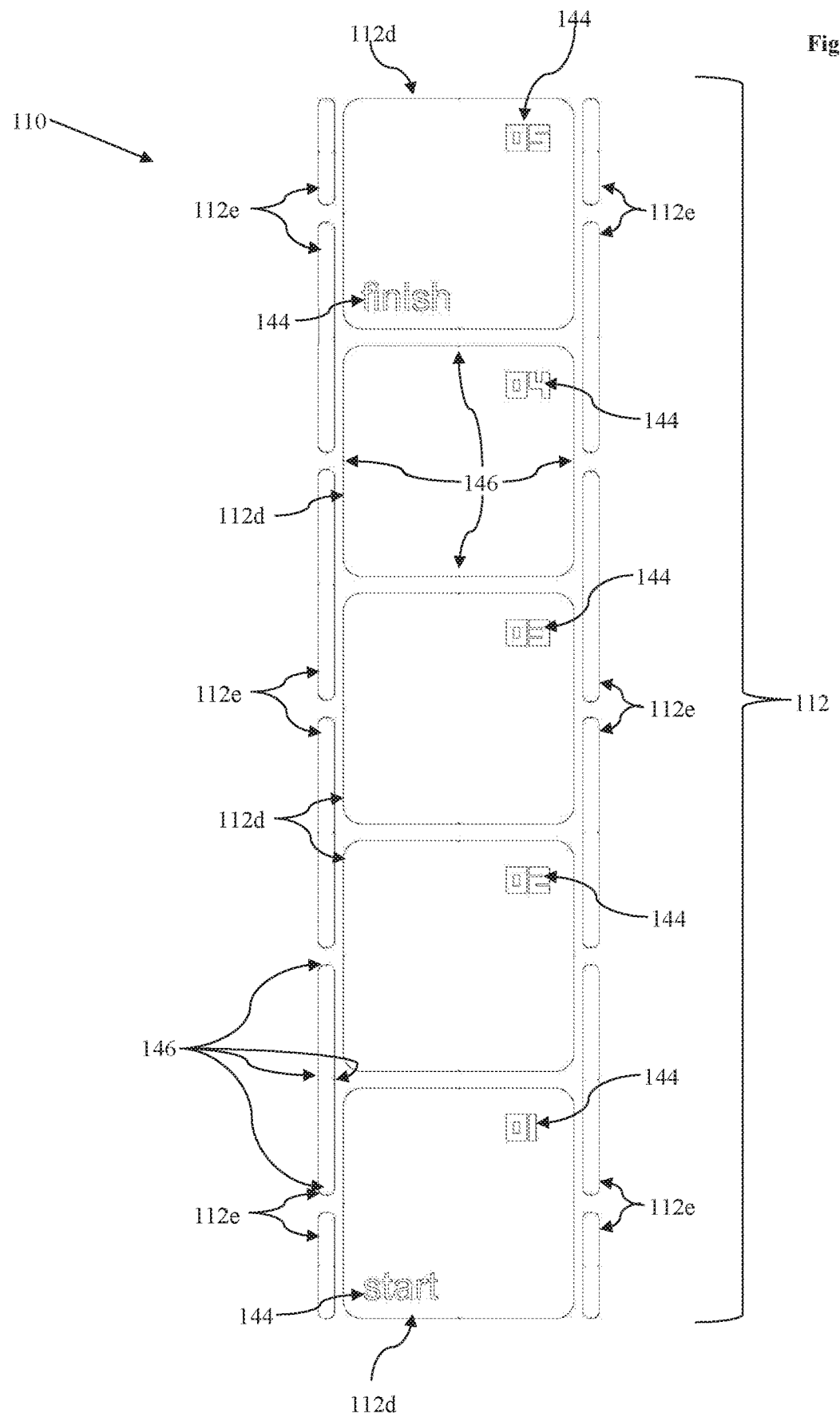
FIG. 7 shows a plan view of a second embodiment of a multi-part surface-mountable physical-activity lamina, in accordance with the third aspect of the invention.

However, it is possible to use positioning locators which do not interengage. An example of such an arrangement is illustrated in FIG. 7, a second embodiment of a lamina being indicated as 110. Identical or similar components to the first embodiment of the invention are referred to using identical or similar reference numerals, and further detailed description will be omitted for brevity.

This particular lamina 110 has a plurality of lamina elements 112 which are not necessarily physically adjacent in the installed lamina 110, as illustrated. The depicted embodiment has a plurality of substantially square indicator lamina elements 112d for use as part of a fitness exercise, and each indictor lamina element 112d indicates a position to which a user should travel to in sequence.

Indicia 144 are formed on the indicator lamina elements 112d and these may be numerical or textual. The remaining border lamina elements 112e provide an aesthetically pleasing surround for the indicator lamina elements 112d, and are here formed as elongate strips.

The indicator and border lamina elements 112d, 112e are typically spaced-apart from one another during installation, as indicated, and therefore at least one alignment marker 146 can be indicated on the surface of the indicator and/or border lamina elements 112d, 112e; these alignment markers 146 may be, as shown in the present embodiment, aligned with the longitudinal and lateral centers of the indicator and/or border lamina elements 112*d*, 112*e*, allowing an installer to align the alignment markers 146 of the indicator and/or border lamina elements 112*d*, 112*e* during installation.

Alignment via the alignment markers 146 may be performed by eye, but more typically an alignment tool such as a laser alignment tool may be utilized in order to ensure that the alignment markers 146 of subsequent indicator and/or border lamina elements 112*d*, 112*e* are coaxial. This may be of particular benefit if, for instance, laying the area of a sports pitch using a graphic design, where the dimensions and relative positions of the markers is critical.

Whilst the above-described embodiments of the invention assume that the graphic designs will be utilized in the context of physical activity environments, in particular in fitness environments such as gymnasia, it will be apparent that such laminas could be used in a wide variety of contexts, and could be mounted to any number of surfaces, be they floors, walls, ceilings, curved or flat.

Furthermore, whilst two embodiments of lamina are described above, each having some form of positioning locator to provide positional alignment between closest lamina elements, it is possible to dispense with such positioning locators. Such lamina elements would require the installer to carefully align the lamina elements with respect to one another, and there would be a greater risk of mismatched lamina elements which could detract from the overall aesthetic appearance of the graphic design.

There has previously been an assumption that the lamina elements will be printed onto the lamina substrate prior to being separated therefrom. However, it will be apparent that the necessary graphic features of the graphic design could be applied to a lamina substrate by means other than printing, such as by utilizing a plurality of differently colored materials to form the media of the lamina, and such arrangements should not be excluded from the scope of the present invention.

It is therefore possible to provide a multi-part surface-mountable physical-activity lamina and a method of producing and assembling such which substantially reduces the amount of material wastage therein. This is achieved by segmenting the graphic design of the lamina into graphic design portions, which can be optimally or near-optimally arranged so as to be applied to a lamina substrate. This results in the necessary lamina elements being formed in a much-reduced surface area when compared with the full lamina. As an additional benefit, the multi-part lamina is simpler to install than a large cumbersome lamina of a given graphic design.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

What is claimed is:

1. A method of producing and assembling a physical-exercise demarcation for use in a fitness, therapy or rehabilitation environment, the physical-exercise demarcation defining a first surface area, the method comprising the steps of:
   a) providing a first graphic design model of a physical-exercise lamina which is to-scale to the in-use physical-exercise demarcation in an assembled condition;
   b) segmenting the first graphic design model into a plurality of graphic design models portions;
   c) arranging the plurality of graphic design model portions into a more compact second graphic design defining a second surface area which is less than the first surface area;
   d) providing a lamina substrate having a third surface area, wherein the third surface area is less than the first surface area and is equal to or greater than the second surface area;
   e) applying the second graphic design to the lamina substrate, the lamina substrate having a mounting-surface-facing layer that comprises an adhesive;
   f) separating the lamina substrate into lamina elements corresponding to the plurality of graphic design model portions; and
   g) assembling the lamina elements onto a mounting surface to provide the physical-exercise demarcation, wherein the mounting surface is a floor or wall in a fitness, therapy or rehabilitation environment and wherein the lamina elements are bonded to the mounting surface by the adhesive on the mounting surface facing layer.

2. A method as claimed in claim 1, wherein, in step b), each of the plurality of graphic design model portions has a positioning locator associated therewith.

3. A method as claimed in claim 2, wherein the positioning locators are complementarily-shaped to interengage with each other.

4. A method as claimed in claim 2, wherein the positioning locators are alignment markers, and step b) includes the use of an alignment tool.

5. A method as claimed in claim 4, wherein the alignment tool includes a laser.

6. A method as claimed in claim 1, wherein, in step e), the second graphic design is printed on the lamina substrate.

7. A method as claimed in claim 1, wherein, in step e), the second graphic design is applied to the lamina substrate by way of cutting.

8. A method as claimed in claim 1, wherein, in step e), a user-facing layer is provided overlying the lamina substrate, the user-facing layer having a coefficient of friction which is greater than that of the lamina substrate.

9. A method as claimed in claim 1, wherein, the lamina substrate including the mounting-surface-facing layer has a thickness in the range of 5 millimeters to 10 millimeters.

10. A method as claimed in claim 1, wherein, during step a), the first graphic design model is provided as a digital graphic design model.

11. A method as claimed in claim 1, wherein the first graphic design model has a plurality of major and minor graphic features, the segmentation in step b) being at or adjacent to an intersection between a major and minor graphical feature.

12. A method as claimed in claim 1, wherein, during step b), the first graphic design model is segmented into segments of repeatable dimensions.

13. A method as claimed in claim 1, wherein, during step c), the second graphic design is determined by an operator, computationally, or a combination thereof.

14. A method as claimed in claim 1, wherein, during step c), the second graphic design is determined so as to optimally fit into a quadrilateral-shaped lamina substrate during step d).

15. A method as claimed in claim 1, wherein the physical-exercise demarcation is for use in aiding or supplementing physical exercise.

16. A method of reducing material wastage in production of a physical-exercise demarcation for use in a fitness, therapy or rehabilitation environment, the demarcation defining a first surface area, the method comprising the steps of:
   a) providing a first graphic design model of a physical-activity graphic lamina which is to-scale to the in-use physical-exercise demarcation in an assembled condition;
   b) segmenting the first graphic design model into a plurality of graphic design model portions;
   c) arranging the plurality of graphic design model portions into a more compact second graphic design defining a second surface area which is less than the first surface area;
   d) providing a lamina substrate having a third surface area, wherein the third surface area is less than the first surface area and is equal to or greater than the second surface area;
   e) applying the second graphic design to the lamina substrate, the lamina substrate having a mounting-surface-facing layer that comprises an adhesive;
   f) separating the lamina substrate into lamina elements corresponding to the plurality of graphic design model portions, and
   g) assembling the lamina elements onto a mounting surface to provide the physical-exercise demarcation, wherein the mounting surface is a floor or wall in a fitness, therapy or rehabilitation environment and wherein the lamina elements are bonded to the mounting surface by the adhesive on the mounting surface facing layer,
   wherein a lamina element may be replaced without replacing the whole physical-exercise demarcation.

17. A method as claimed in claim 16, further comprising a subsequent step of replacing a lamina element forming the assembled physical-exercise demarcation when damaged without requiring replacement of the whole physical-exercise demarcation.

18. A method as claimed in claim 16, wherein the physical-exercise demarcation is for use in aiding or supplementing physical exercise.

19. A physical-exercise demarcation apparatus for use in a fitness, therapy or rehabilitation environment, the physical-exercise demarcation apparatus defining a first surface area in the fitness, therapy or rehabilitation environment, the physical-exercise demarcation apparatus being assembled by a method comprising the steps of:
   a) providing a first graphic design model of a physical-exercise lamina which is to-scale to the in-use physical-exercise demarcation in an assembled condition;
   b) segmenting the first graphic design model into a plurality of graphic design models portions;
   c) arranging the plurality of graphic design model portions into a more compact second graphic design defining a second surface area with is less than the first surface area;
   d) providing a lamina substrate having a third surface area, wherein the third surface area is less than the first surface area and is equal to or greater than the second surface area;
   e) applying the second graphic design to the lamina substrate, the lamina substrate having a mounting-surface-facing layer that comprises an adhesive;
   f) separating the lamina substrate into lamina elements corresponding to the plurality of graphic design model portions; and
   g) assembling the lamina elements onto a mounting surface to provide the physical-exercise demarcation, wherein the mounting surface is a floor or wall in a fitness, therapy or rehabilitation environment and wherein the lamina elements are bonded to the mounting surface by the adhesive on the mounting surface facing layer.

20. A physical-exercise demarcation apparatus as claimed in claim 19, wherein each of the plurality of graphic design model portions has a positioning locator associated therewith.

21. A physical-exercise demarcation apparatus as claimed in claim 19, wherein a user-facing layer is provided overlying the lamina substrate, the user-facing layer having a coefficient of friction which is greater than that of the lamina substrate.

22. A physical-exercise demarcation apparatus as claimed in claim 19, wherein the lamina substrate including the mounting-surface-facing layer has a thickness in the range of 5 millimeters to 10 millimeters.

23. A physical-exercise demarcation apparatus as claimed in claim 19, wherein the physical-exercise demarcation apparatus is designed to aid or supplement physical activity.

* * * * *